United States Patent Office 3,290,413
Patented Dec. 6, 1966

3,290,413
TRANSPARENT IMPACT-RESISTANT POLYSTYRENE CONTAINING POLYSULFIDE POLYMER
Edward M. Fettes, Oakmont, Pa., assignor to Koppers Company, Inc., a corporation of Delaware
No Drawing. Filed July 8, 1963, Ser. No. 293,248
2 Claims. (Cl. 260—874)

This invention relates to improved resinous compositions and, more particularly, it relates to vinyl aromatic resin-rubber compositions having improved physical properties.

Polystyrene has been widely used as a molding composition and is noted for the clarity of its product. However, for many purposes, polystyrene is unsatisfactory because of its low impact resistance and low flexibility. Improvements have been obtained in such properties by blending preformed polystyrene with a rubbery material, but the resultant products have been characterized by such undesirable properties as opacity, poor heat and light stability, and poor resistance to oxygen.

Various methods and materials have been suggested to prepare a flexible, impact-resistant polystyrene composition which has the additional advantage of being as completely transparent as unmodified polystyrene. An impact-resistant transparent polystyrene has been prepared by the quantitative grafting of styrene onto a polyacrylic ester rubber. By this method, a cross-linked polyacrylic ester rubber containing azonitrile groups is swollen in styrene and heated at 50° C. for several days. Because no thermal polymerization takes place at 50° C., practically all of the styrene grafts onto the rubber. After mastication on a mill, these graft copolymers become a thermoplastic material. Moldings made therefrom are transparent and have good impact strength whenever 20–25 percent of the polyacrylic ester rubber is present. However, this transparent graft material is limited in its commercial application because the need for large amounts of rubber in the composition greatly increases the cost of the final product. The method of preparation of this composition is also limited with respect to time; it takes several days to produce the impact-resistant material. Another method of preparing transparent, impact-resistant polystyrene is by the copolymerization of styrene with an unsaturated polyester rubber. Impact-resistant polystyrene made from these materials and this method also require excessive amounts of rubber (about 40 percent of total composition).

I have unexpectedly found that vinyl aromatic resin compositions of improved clarity can be obtained by mechanically blending small amounts of a polysulfide polymer with a vinyl aromatic resin, e.g., polystyrene until the ultimately desired resin-rubber blend is obtained. Thus, a polysulfide polymer can be blended with polystyrene in a mechanical blender until the desired polystyrene-rubber composition is obtained, which composition is transparent, has good impact strength, and high tensile strength. It is most unexpected that prepared blends of polystyrene with small amounts of polysulfide polymers acquire a high tensile strength in addition to a good impact strength. These results are most unexpected because the polysulfide polymers used in this invention are not susceptible to chemical grafting with the polystyrene resin. Since the greater impact strength of rubber-styrene or rubber-polystyrene blends has heretofore depended upon a specific amount of grafting of resin onto the rubber component the results achieved by my invention are amazing. Additionally, an increase in impact strength of a blended, non-grafted rubber-resin material has been known to be accompanied by a decrease in tensile strength. Surprisingly, the prepared blends of this invention not only have good impact strength, but also retain good tensile strength as an important additional characteristic.

In accordance with this invention, resin-polysulfide polymer rubber compositions are prepared by blending a normally solid thermoplastic vinyl aromatic resin e.g., polystyrene and a polysulfide polymer rubber, prepared by the reaction of a sodium polysulfide with an organic dihalide, into a substantially uniform mass and the thus-blended material is thereafter kneaded or mechanically worked for a short period of time, e.g., a time of from 5–90 minutes. In one particularity, I have found that if the vinyl aromatic resin is first plasticized by mixing the resin with the polysulfide polymer and then a lubricant is added and further mixing is provided, the resultant products have excellent clarity.

The products of this invention having the most useful combination of impact strength, tensile strength, and transparency are those which have a total polysulfide polymer content of between two and seven percent by weight of the total blend. An amount of polysulfide polymer less than two percent by weight results in a lowered impact strength to the final product. Polysulfide polymer in amounts greater than seven percent by weight do not essentially improve the impact, tension, and clarity characteristic of the resultant product.

The rubber materials which may be employed in this invention consist of polysulfide polymers which are derivatives of the dihalides such as, for example, dichloroethyl formal, dichloroethyl ether, and ethylene dichloride. These polysulfide polymers may, for the purposes of this invention, be in the form of crude rubbers (Thiokol ST), water dispersions, or liquid polymers. The liquid polymers are low molecular weight (about 4000 or less) polymers and may also be prepared from dichloroethyl formal and a small amount of a trifunctional halide such as 1,2,3-trichloropropane (Thiokol LP–2, LP–3). The water dispersions are all high molecular weight polymers (Thiokol WD–6, WD–2, DCE, TDC).

The vinyl aromatic resins to be employed in preparing the compositions are the normally solid polymers having an average molecular weight of at least 50,000, as determined by the Staudinger method, of one or more polymerized monovinyl aromatic hydrocarbons of the benzene series. An example of a suitable monovinyl aromatic hydrocarbon is styrene. Copolymers of styrene, such as a styrene acrylonitrile copolymer may also be used to provide the resin useful in this invention. The resinous polymer is employed in amounts of from 93–98 percent by weight of the composition. Lesser amounts of resinous polymer may be employed without detrimentally effecting the resultant impact-resistant composition.

It is important that the rubbery component of the high-impact product of this invention be of the classification hereinabove described in order that the composition possess good transparency characteristics and mechanical properties such as being capable of forming molded or extruded articles having a smooth surface together with good tensile strength and high impact strength.

The method of this invention results in the formation of new and improved resinous compositions from thermoplastic vinyl aromatic resins and polysulfide polymers which compositions possess higher impact and tensile strength than do ordinary polystyrene compositions while maintaining, simultaneously, the transparency and clarity normally associated with molded products made from unmodified polystyrene material.

In addition to the required ingredients of this invention as stated above, it is often desirable to incorporate small quantities of compounding additives, such as rubber stabilizers, antioxidants, plasticizers, lubricants, blending agents, color stabilizers, optical bleaching agents, blueing agents and the like. An antioxidant can be added to prevent possible degradation of the styrene polymer material during the blending operation or to protect the final products against air or weather degradation. An example of such antioxidant is di-tert.-butyl p-cresol sold under the trademark DBPC by Koppers Company, Inc. A lubricant, as for example, zinc stearate, may be used to impart desirable flow and molding properties to the finished compound. Color stabilizers such as Tinuvin P having the chemical composition 2(2'-hydroxy-5'-methylphenyl)-benzotriazole and blue dyestuffs such as Perox 2-R having the chemical composition dibromodixylenoanthraquinone, 1,4-bisanilinoanthraquinone, and 1-hydroxy-4-p-anisidinoanthraquinone in minute quantities have been found to be very effective in overcoming any discoloration which may appear in molded products made from the novel high-impact blends of this invention. Other than providing the results normally achieved when incorporated in high impact polystyrenes, these additives do not influence the other desirable properties of the final products prepared from the blends of this invention.

It is necessary in carrying out the method of this invention that the ingredients be well blended with one another. The entire operation can be carried out in available commercial blenders, mixers or extruders. For example, the mixing operation may be carried out in a Banbury mixer. In this case, the polysulfide rubber is charged into the mixer with the selected quantity of vinyl aromatic resin and the mixer set in motion. The mixer, prior to blending, is preheated to about 160° C. although the temperature during the mixing operation within the chamber may, without detrimentally affecting the blend, be as high as about 200° C. Mixing is continued until the ingredients are completely blended together. Mixing time may vary from 5–90 minutes depending upon the charge quantity contained within the mixer.

Instead of a Banbury mixer, a Brabender Plasticorder can be used. The chamber of the Plasticorder is preheated to 160° C. and the charge of polysulfide rubber and vinyl resin along with any other ingredients such as an antioxidant are added to the mixing chamber and mixing is continued until a complete blending of materials is obtained.

In place of a batch mixer of the type described above, an extruder such as a Hartig 1¼ inch plastics extruder may be used.

In practice and after mixing, the final blended material is cooled and cut or ground into a granular form suitable for molding and subsequently molded in molding machinery, such as a Van Dorn injection molding machine, to produce transparent, impact-resistant molded articles.

The following examples illustrate ways in which the principle of the invention has been applied, but are not to be construed as limiting its scope.

*Example I*

In each of a series of experiments, a charge of a polystyrene polymer was blended in a Banbury mixer, size "00" (Farrell Birmingham Company) with a charge of a polysulfide polymer in proportions as shown in Table I. In certain of the experiments there was added zinc stearate as an internal lubricant, Polygard (a rubber stabilizer comprised of an alkylated aryl phosphite) and an antioxidant (di-tert.-butyl p-cresol). In those experiments in which zinc stearate was used, the polysulfide polymer and polystyrene were blended for a short period of time prior to the addition of the zinc stearate so that the stearate lubricant would not forestall the mixing action of the mixing blades on the blending materials. The charged materials were blended in the Banbury mixer for from 5–45 minutes at temperatures of from 120–160° C. After the charged materials were thoroughly mixed, the blended composition was removed from the Banbury mixer, cooled, and chopped or cut into granular form suitable for molding. Samples of the granular composition were charged into a Van Dorn two ounce injection molding machine and molded at between 320° and 370° F. to form test specimens of ½" x ⅛" x 4". The thus-molded specimens were tested for impact strength by procedure similar to that described in ASTM D256–47T and for clarity by visual inspection under natural and artificial light. Table I identifies the experiments and gives the proportion of polystyrene, polysulfide rubber, and other additives employed therein.

TABLE I

| Run No. | Polystyrene Beads, g. | Thiokol ST Rubber | | Zinc Stearate, g. | Polygard, g. | DBPC (B), g. | Mixing Time min. | Izod (E) | Gel in Toluene, percent | | Color of Moldings | Clarity |
|---|---|---|---|---|---|---|---|---|---|---|---|---|
| | | G. | Percent | | | | | | Micro | Macro | | |
| 1 | 2,475 | 25 | 1 | 3.13 | 3.13 | 1.25 | 5 | 0.72 | 0.7 | None | None | Transparent. |
| 2 | 2,450 | 50 | 2 | 3.13 | 3.13 | 1.25 | 5 | 0.93 | 1.0 | ---do--- | Pale Light Straw. | Do. |
| 3 | 2,400 | 100 | 4 | 3.13 | 3.13 | 1.25 | 5 | 1.06 | 2.0 | ---do--- | Light Straw. | Do. |
| 4 | 2,400 | 100 | 4 | 3.13 | 3.13 | 1.25 | 5 | 1.06 | 1.7 | ---do--- | ---do--- | Do. |
| 5 | 2,400 | 100 | 4 | 3.13 | 3.13 | 1.25 | 15 | 1.08 | 3.8 | ---do--- | ---do--- | Do. |
| 6 | 1,675 | 126 | 7 | 2.4 | 2.4 | 0.8 | 45 | 1.05 | 5.6 | ---do--- | Straw | Do. |
| 7 | 1,675 | 126 | 7 | 2.4 | 2.4 | 0.8 | 45 | 1.04 | 3.7 | ---do--- | ---do--- | Do. |
| 8 | 1,675 | 126 | 7 | | | | 45 | 1.06 | 3.4 | ---do--- | ---do--- | Do. |

As indicated in Table I the resulting products were transparent compositions having good impact strength. Percentages of microgel which were determined in this series of experiments indicate that the polystyrene and polysulfide rubber exist independently in the blended material without grafting. The particular polysulfide polymer, Thiokol ST, used in these experiments is not soluble in toluene. Therefore, the percentage of Thiokol ST rubber used in the polymer blend should appear in insoluble gel in toluene. However, as is indicated in Table I, the percentages of microgel are lower than the percentages of initial rubber indicating that a major amount of the polysulfide polymer has been so finely dispersed in the polystyrene and subsequently in the toluene that it went through the fine pores of the crucible used in this analytical method. Pore size of the crucible used is about 4–5.5 microns. If a chemical grafting had occurred between the blended materials, the percentage of microgel would exceed the amount of initial polysulfide polymer charged under the test conditions used herein.

*Example II*

In a series of experiments a charge of 2400 grams of polystyrene and 100 grams of Thiokol ST crude rubber and 3.13 grams of zinc stearate and 1.25 grams of di-t-butyl-p-cresol was blended in a Banbury mixer as described in Example I at mixing temperatures of about 160–180° C. for about five minutes. Additionally the charges contained coloring additives in amounts as stated in Table II. Molded test pieces of the composition were tested employing procedures similar to those employed in Example I. In addition, the color of the molded plaques was examined to determine the effect of the coloring additives.

TABLE II

| Run No. | Polygard, g. | Additive | Izod Impact Strength, ft.-lb./in. | Gel in Toluene, percent | | Color of Molded Plaque |
|---|---|---|---|---|---|---|
| | | | | Micro | Macro | |
| 1 | 3.13 | 2 g. Tinuvin P | 1.16 | 3.0 | None | Almost Colorless. |
| 2 | 3.13 | 0.0025 g. 1,4-Bisanilino Anthraquinone. | 1.10 | 3.4 | ___do_____ | Light Gray. |
| 3 | 3.13 | 0.0025 g. Perox Blue 2-R | 1.04 | 2.7 | | Colorless. |
| 4 | 3.2 | _____do_____ | 1.24 | 3.0 | None | Do. |
| 5 | 3.2 | 0.0025 g. Perox Blue 2-R+ 5 g. Tinuvin P. | 1.07 | 1.6 | ___do_____ | Light Straw |

In Example II, transparent, impact-resistant materials were obtained which were completely colorless or almost colorless under both artificial and natural light. The coloring additives had no detrimental effects on the transparency or impact strength of the molded material.

*Example III*

In each of a series of experimental runs a charge of a polystyrene polymer was heated and milled in a Banbury mixer with a charge of a polysulfide polymer (Thiokol ST crude rubber) in proportions as indicated in the following table to form a thoroughly blended composition. Charged materials were blended in the mixer for from 5–90 minutes at temperatures of between 120° C.–180° C. after which the blended material was removed from the mixer, allowed to cool to room temperature and chopped to a granular form suitable for molding. Specimens of the chopped composition were injection molded at about 350° F. and about 1200 p.s.i.g. pressure into test pieces of ½″ x ⅛″ x 5″ bars. These test bars were used to determine the tensile strength and percent elongation of the composition employing procedures similar to those described in ASTM D638–49T. Impact strength was determined by procedures similar to those described in ASTM D256–47T. Table III identifies the experiments and gives the proportions of polystyrene and polysulfide rubber employed in making each experimental composition.

TABLE III

| Run No. | Thiokol ST Rubber, percent | Milling Time, min. | Total Charge, g. | Izod Impact Strength, ft.-lb./in. | Tensile Strength, p.s.i. | Tangent Modulus, p.s.i.×10³ | Elongation, percent |
|---|---|---|---|---|---|---|---|
| 1 | 7 | 45 | 1,806 | 1.22 | 8,010 | 521 | 3.5 |
| 2 | 7 | 90 | 1,806 | 1.16 | 7,770 | 538 | 3.3 |
| 3 | 7 | 45 | 1,806 | 1.18 | 8,080 | 509 | 3.1 |
| 4 | 4 | 15 | 2,500 | 1.08 | 8,520 | 501 | 4.0 |
| 5 | 4 | 5 | 2,500 | 1.06 | 8,500 | 513 | 4.3 |

*Example IV*

For the purpose of comparing impact strength, the polystyrene starting material used in Example III was molded in the same manner as the blended composition described in Example III and the properties determined for several samples are included in Table IV below.

The results obtained are comparable to the well-known physical properties of molded polystyrenes as shown, for example, in Koppers Technical Bulletin C-9-231, Dylene polystyrene.

The comparative results of Tables III and IV indicate a tremendous improvement in the impact strength of the blended materials of my invention over the impact strength of normal polystyrene. The tensile strength of my blended materials is equivalent to that of normal polystyrene even though lower tensile strengths have been expected heretofore in blended non-grafted resin-rubber compositions.

TABLE IV

| Run No. | Thiokol ST Rubber, percent | Izod Impact Strength, ft.-lb./in. | Tensile Strength, p.s.i. | Elongation, percent |
|---|---|---|---|---|
| 1 | 0 | 0.32 | 7,500 | 1.5 |
| 2 | 0 | 0.56 | 7,650 | 1.7 |
| 3 | 0 | 0.65 | 8,500 | 1.6 |
| 4 | 0 | 0.59 | 8,000 | 1.9 |

*Example V*

To compare the clarity obtained by the blend of polystyrene and polysulfide rubber with the clarity obtainable when a dissimilar rubber is used in the blended material, a charge of polystyrene, polysufide polymer and an additional resin or rubber material was compounded on a Banbury mixer at 160–180° C. for from between 5–45 minutes. The additional resin used was a typical diene rubber commonly used in preparing impact polystyrene materials and identified as diene 35, a polybutadiene rubber of an average Mooney viscosity of 35. This rubber was added to the blending materials in amounts of from one percent to six percent of the total charge materials. In all cases, the molded plaques made from the thus-blended material were either translucent or opaque. Table V identifies the experiments and gives the properties determined for the compositions.

TABLE V

| Run No.* | Thiokol ST Rubber, percent | Additional Resin or Rubber | Izod Impact Strength, ft.-lb./in. | Clarity | Color |
|---|---|---|---|---|---|
| 1 | 1 | 1% Diene 35 | 1.24 | Translucent | White. |
| 2 | 1 | 6% Diene 35 | 1.65 | Opaque | White. |
| 3 | 3 | 4% Diene 35 | 0.55 | ___do_____ | Straw. |
| 4 | | 5% Diene 35 | 1.02 | ___do_____ | White. |

*Total charge including polystyrene was 2.5 kg.

*Example VI*

In each of a series of experiments a charge of polystyrene was compounded in a Banbury mixer at a temperature of about 180° C. with a polysulfide rubber in the form of either a liquid polymer or a latex in an amount as stated in the following table to produce a thoroughly blended composition. Molded test pieces of the composition were tested employing procedures similar to those in previous examples. Table VI identifies the experiments and gives the properties determined for the compositions.

TABLE VI

| Run No. | Thiokol Latex, Percent Solids* and Type | Thiokol LP2 Liquid percent* | Additive | Izod Impact Strength, ft.-lb./in. | Clarity | Color |
|---|---|---|---|---|---|---|
| 1 | 4% ST | | | 1.04 | Transparent | Straw. |
| 2 | 3% ST | | 10 p.p.m. Perox Blue 1120-3034. | 1.02 | do | No color. |
| 3 | 3% ST | | do | 1.00 | do | Do. |
| 4 | 4% WD-2 | | | 1.06 | do | Yellow. |
| 5 | 4% WD-2 | | | 1.04 | do | Light Yellow. |
| 6 | | 4% | | 1.1 | do | Light Brown. |

*Percentage is based on solids used in preparing the blend.

As can be seen, the particular latex and liquid polymer materials used had no ill effect on the final composition. Transparent molded products were obtained which maintain impact strengths similar to those obtained using a polysulfide crude rubber.

The compositions of my invention are resin-rubber blends which can be used as molding materials to produce articles having improved impact strength while simultaneously maintaining a desired transparency. If desired, these compositions may be modified through the addition of various conventional additives such as dyestuffs, lubricants, fillers, plasticizers, stabilizers, antioxidants and the like.

I claim:
1. An impact-resistant transparent thermoplastic composition comprising a blend of from 2–7 parts by weight of a liquid polysulfide polymer and from 93–98 parts by weight of polystyrene.

2. A process for making a moldable resin-rubber composition suitable for making impact-resistant transparent articles which process is comprised of thoroughly blending from 2–7 parts by weight of a liquid polysulfide polymer with from 93–98 parts by weight of polystyrene.

References Cited by the Examiner
UNITED STATES PATENTS 2,466,963  4/1949  Patrick et al. _____ 260—874
2,519,775  8/1950  Lougovoy _____ 260—874

MURRAY TILLMAN, *Primary Examiner.*
E. B. WOODRUFF, G. LESMES, *Assistant Examiners.*